United States Patent Office 2,750,412
Patented June 12, 1956

2,750,412

ALCOHOL RECOVERY OF ORGANIC ACIDS AND SALTS THEREOF

Lloyd T. Sandborn and William B. Stengle, Crossett, Ark., assignors to Crossett Lumber Company, Crossett, Ark., a corporation of Arkansas No Drawing. Application November 3, 1952,
Serial No. 318,532

11 Claims. (Cl. 260—527)

This invention relates to the recovery of organic acids from a concentrate of the black liquor resulting from alkaline pulping processes in such a manner as to return to the pulp mill the soda and organic matter in a form in which they can be used in the conventional recovery system thereof.

While this invention is also quite applicable to the recovery of organic acids from a concentrate of the liquor resulting from cooking cellulosic material, such as wood or the like, in the presence of an alkali, this process of producing organic acids being disclosed and claimed in our co-pending application Serial Number 318,533, filed November 3, 1952, for the sake of clarity and simplicity, the present invention will be described for the most part with reference to recovering organic acids from black liquor concentrate. Therefore, it is intended that the term "concentrate" used herein shall include both of said concentrates.

By the use herein of the expression "alkaline cook of cellulosic material," we intend to include black liquor from alkaline pulping processes as well as the liquor from the type cooks described in Example 8 hereinafter.

When wood is cooked with sodium hydroxide, as in the soda process, or with sodium hydroxide and sodium sulfide, as in the kraft process, part of the lignin and part of the hemicellulose dissolve and leave the cellulose in a form suitable for paper making. The solution containing the material which has dissolved during pulping is commonly called black liquor. It is usual practice to concentrate this liquor by evaporation and to burn the solids thereof in a furnace for recovery of the soda. Burning of the organic matter in the black liquor furnishes a large part of the heat requirements of the pulp mill. In the kraft process, the organic matter serves a further useful function by reducing sulfur compounds to sufide. The molten residue from the furnace contains sodium carbonate and, in the kraft process, some sodium sulfide. By dissolving this material in water and treating it with calcium hydroxide, a solution of sodium hydroxide and sodium sulfide is obtained for re-use as cooking liquor for another batch of wood. In order for the pulping processes to be economical, it is necessary to minimize losses of soda, sulfur and organic matter.

It is known that black liquor contains sodium formate and sodium acetate. We have discovered that, in addition to these salts, black liquor also contains substantial quantities of sodium lactate and sodium glycolate. The acids of these salts (formic, acetic, lactic and glycolic) are the ones of chief concern according to this invention. They can be defined as saturated monocarboxylic acids having 1–3 carbon atoms in which one of the carbon atoms adjacent the carboxyl group can be substituted by an hydroxyl group. We have also found that these four salts in appreciable quantities can be produced by cooking cellulosic materials in the presence of an alkali according to our above identified co-pending application. Having established the identity of these two additional valuable salts, the importance of recovering them from the liquor instead of burning them was apparent.

We know of no conventional process that would be satisfactory for the recovery of these acids. One such process involves acidifying the black liquor with a mineral acid, such as e. g. sulfuric acid, to liberate the desired organic acids from their salts and to precipitate undesired organic material. However, this process is far from being satisfactory. Its drawbacks include the following. (1) It converts all the soda to sulfate and thereby upsets the balance of a pulp mill recovery system by making it impossible to reuse the soda in the mill. (2) It leaves dissolved in the black liquor a substantial portion of the undesirable organic matter, the presence of which increases the difficulty of separating out said acids. (3) It requires a large amount of mineral acid and therefore is quite uneconomical.

An object of the present invention is to provide a process for recovering organic acids and their sodium salts from black liquor concentrate and a concentrate of the liquor resulting from an alkaline cook of cellulosic material. A further object is to provide such a process whereby organic acids are recovered with minimum losses of soda, sulfur and organic matter. A still further object is to provide such a process which is economical and relatively simple. Other objects will be apparent from the description of this invention given hereinafter.

The above and other objects are accomplished according to the present invention of separating from a concentrate of the black liquor resulting from alkaline pulping processes or a concentrate of the liquor resulting from an alkaline cook of cellulosic material, saturated monocarboxylic acids having 1–3 carbon atoms in which one of the hydrogen atoms on the carbon atom adjacent the carboxyl group may be substituted by an hydroxyl group, by employing a process which comprises contacting the concentrate with a solvent for the sodium salts of said acids, the solvent being selected from the group consisting of methanol, ethanol, and propanol, a mixture of methanol and ethanol, a mixture of at least one of propanol and butanol with methanol, and a mixture of at least one of propanol and butanol with ethanol.

Then the solvent, containing the sodium salts of said acids, is filtered from the remainder of the concentrate and the solvent employed is removed from the filtrate. Next, the undesirable material is precipitated from the substantially solvent-free filtrate by acidifying same, and finally the precipitate is removed to obtain a mixture of said acids in aqueous solution. If only the sodium salts of said acids are desired, the steps of acidifying the filtrate and removing the resulting precipitate are omitted.

According to this invention, a practical method of separating these acids from black liquor is based on our finding that when black liquor concentrate is contacted with certain alcohols or mixture thereof as a solvent, the salts of the desired acids dissolve more readily in the solvent than do the undesired materials. We have found that the relative solubilities are such as to permit a separation of the desired sodium salts of organic acids from other constituents in black liquor. The desired salts are obtained in alcoholic solution leaving material containing soda and organic matter in a form suitable for use in the pulp mill recovery system. The process comprises contacting black liquor concentrate with an alcohol or mixture of alcohols and separating the insoluble material from the solution. The physical characteristics of the insoluble material will vary somewhat depending on what alcohol is used and on the amount of water in the system. The precipitate is washed with more solvent to free it of mother liquor and to remove most of the desired salts. Then, after heating the precipitate to distill off occluded alcohol, the residue is returned to the pulp mill recovery system. The alcohol solution containing the desired salts is heated to distill off the alcohol, the alcohol being reused in the process. If dry black liquor solids have been used, desirably water is added at this point so that, after the alcohol is distilled off, the residue consists of an aqueous solution containing the desired sodium salts of organic acids along with some other soluble organic matter. On adding enough sulfuric acid to lower the pH to 2.0-2.5, a precipitate of organic matter is obtained and the free organic acids which are liberated from their salts by the sulfuric acid remain in the solution. The precipitate is removed and returned to the pulp mill recovery system. The solution contains the free organic acids and sodium sulfate. These acids can be recovered from the aqueous solution by extraction or by other known means. For example, the volatile acids, acetic and formic, can be removed with the water by distillation and the lactic and glycolic acids can be recovered from the residue by treatment with an alcohol to produce esters. The sodium sulfate which remains in solution can be recovered by evaporation and, if the kraft process is used for pulping, it can be returned to the furnace. This return of part of the soda to the recovery system as sodium sulfate makes this process especially desirable in the kraft process.

The process as outlined above can be followed in all cases, but certain details of manipulation will vary depending on such factors as the kind of alcohol used, the amount of water in the alcohol, and the amount of water in the black liquor concentrate. Each of these factors is discussed below.

Alcohols applicable in this invention include methanol and ethanol, a mixture of methanol and ethanol, and mixtures of at least one of propanol and butanol with methanol. When employing such a mixture of alcohols, better results are obtained if methanol constitutes at least about 50% of the mixture. However, mixtures of at least one of propanol and butanol with ethanol give satisfactory results.

Isopropanol alone can be used but it is a poorer solvent than methanol or ethanol for the desired salts. It has been found that while isopropanol is not a good solvent for the desired salts, it is an even poorer solvent for the other materials that need to be separated from said salts. Consequently, when isopropanol is used, only a small part of the desired salts dissolve in the alcohol. However, very little other material dissolves and the salts that do dissolve can be recovered in relatively pure form.

When mixtures of propanol or butanol with methanol are used, it is possible to control the relative solubility of desired and undesired portions of black liquor by variation of the ratio of methanol to propanol or butanol. As the amount of propanol or butanol in the mixed solvent is increased, the ability of the solvent to dissolve the desired salts is slightly diminished but the solubility of the undesired material is diminished to a much greater extent.

The same type of control of relative solubility can be obtained by using mixtures of ethanol with propanol or butanol, but since a greater range of solubilities can be obtained with mixtures containing methanol, preferably methanol will be one constituent of the mixture when using mixed alcohols as solvents.

Certain generalized statements can be made concerning the advantages and disadvantages of the various alcohols. In general, the solubilities of the salts decrease as the number of carbon atoms in the alcohol increases. Methanol is the best solvent and ethanol is next best, followed by propanol and butanol. In general, the solubility of the material which is to be removed follows the same trend of being most soluble in the lower molecular weight alcohols. The solubility of this material in the different alcohols does not change in the same magnitude as does the solubility of the sodium salts of the organic acids. In general, the decrease in solubility of this material is more pronounced as the size of the alcohol molecule is increased than is the change in solubility of the salts of the organic acids. For example, the solubilities of the sodium salts are only slightly less in ethanol than in methanol but the other organic material is much less soluble in ethanol than it is in methanol. This desirable difference in solubility that is observed in using ethanol in place of methanol can be obtained by using mixtures of methanol with one or more of the other alcohols listed above. By adding isopropanol or butanol to methanol, the solubility of said salts will be diminished slightly but the solubility of the other black liquor components will be greatly diminished and a cleaner separation can be accomplished.

The amount of water present in the alcohol also affects its solvent power both for the sodium salts and for the other black liquor solids. In general, the presence of water increases the solubility of the other black liquor constituents to a greater extent than it increases the solubility of the sodium salts. This difference is most pronounced in the case of methanol. The converse of this is true with ethanol. Addition of water to ethanol improves its solvent action for the desired salts much more than it does for the undesired organic matter, so that the salts are approximately as soluble in ethanol containing 30% water as they are in anhydrous methanol. Therefore, when methanol is used by itself it is desirable to have as little water present as possible, and when a substantial amount of water is present it is desirable to use ethanol or a mixture of methanol with a higher molecular weight alcohol.

From the standpoint of the final effect of water on the solubility of the salts in alcohol, it does not matter whether the water is initially associated with the black liquor solids or with the alcohol. However, a distinction has been made because the amount of water that is present in the black liquor concentrate substantially influences the physical characteristics of the black liquor concentrate. In turn, the physical characteristics of the black liquor concentrate largely determine the preferred manner of mixing the concentrate with alcohol and the preferred methods of separating the insoluble material from the alcohol solution of the organic acid salts.

The black liquor as it comes from the pulp mill digester contains about 20% solids, and it is diluted still further by water used for washing the black liquor from the pulp. It is preferable not to mix this dilute black liquor with alcohol directly, because large volumes of alcohol are required to reach the desired alcohol-water ratio. In ordinary pulp mill operations this liquor is evaporated in multiple effect evaporators to a solids content of 40%-50%. The water content is reduced still further by contacting the concentrated liquor with the hot gases from the pulp mill recovery furnace. By this means, the concentration is increased to 60%-65% solids in which condition the concentrate, while hot, is fluid enough to be pumped and can be sprayed into the furnace in much the same manner that oil is used in a spray type oil burner. When the 60%-65% solids concentrate of black liquor cools, it becomes semi-solid and has the appearance of a soft tar. By adding a little alcohol, e. g. in the ratio of one part of alcohol to 6 to 7 parts of the concentrate, this tar-like mass can be thinned so that it will flow at ordinary temperature.

In some cases practically all of the water is removed from the black liquor by spray drying, drum drying, or in other known manner to give a free-flowing powdery solid. These solids may still contain 5%-15% water but because of their powdery, dry appearance, they are referred to as dry black liquor solids to distinguish them from the tarry material containing 60%–65% solids. Actually, since some water is present in all cases, the term "black liquor concentrate" is used herein to mean any black liquor from which water has been removed to such an extent that by use of reasonable volumes of alcohol, one can obtain the desired ratios of water to alcohol during the separation of organic acid salts from the rest of the solids. These ratios usually will vary from about zero to about 40 parts of water per 100 parts of alcohol.

Although preferably the solids content of our black liquor concentrate will be 60%–65%, by use of larger volumes of alcohol the 40%–50% solids liquor may be used as it comes from the evaporators. While it is possible to use liquor with less than 40% solids, the economy of the process decreases with weaker liquors.

Good results can be obtained by extracting dry black liquor solids with dry methanol. This type of starting material lends itself readily to conventional types of counter-current extraction. While use of the dry solids has many advantages, there are also some disadvantages. One very obvious difficulty is that some of the desired salts must be inside the individual particles of the dry solids. In order for the solvent to dissolve these materials, it must first reach them by penetrating or diffusing through the outer portion of the particle. This difficulty is minimized by use of very small particles and by drying the material in such a manner that the individual particles will be porous, thereby enabling the solvent to penetrate easily to the inside of the particle. It will take longer to extract the large or non-porous particles than will be required for the small porous particles. In general, porosity is a more important characteristic than particle size. The fact that with solid particles the time of contact with solvent is significant is illustrated by tests in which all other conditions were the same but contact times were varied. A half hour contact removed 51%–65% of the acids as compared to 73%–80% removal with a 24-hour contact time.

The possibility of variation in efficiency of extraction that is caused by variation in physical characteristics of the dry solid can be avoided by starting with the black liquor concentrate that contains 60%–65% solids. In this event, the desired salts are already in solution and they remain in solution after the alcohol is added, although a large portion of the other black liquor solids will be precipitated. The portion of the salts that remains occluded to the precipitate in the form of mother liquor can be recovered easily by washing the precipitate with more alcohol. These washes can be combined with the solution from which solids have been precipitated but, for the sake of economy, it is preferable to use the wash alcohol containing low concentration of organic acid salts as the alcohol to add to another portion of black liquor concentrate. Thus, the process can be operated in a continuous manner with fresh alcohol being applied first to the precipitate and then added to the concentrate.

The physical properties and amount of the precipitate will vary depending on the nature of the alcohol and the amount of water that is present. In the case of methanol, a finely divided precipitate forms. Most of the solution can be removed by decantation. It can also be centrifuged or filtered in conventional manner. It retains this powdery form during washing, and the washing operation is also conventional. The amount of water present does not appear to cause any change in the characteristics of the precipitate but only in the amount obtained.

With alcohols other than methanol, the precipitate forms a sticky semi-fluid mass that varies in properties from a heavy tar-like mass to a syrupy mass depending on the amount of water present and the alcohol used. This semi-fluid precipitate is heavier than the alcohol and is easily separated. In many cases, it is sufficiently fluid so it can be handled in the manner usual for separation of layers in a two-layer liquid system. Example 7 hereinafter illustrates one way of treating such material.

The formation of two layers rather than a powdery solid phase precipitate simplifies the mechanics of separation but it makes complete removal of the desired salts more difficult. In cases where two layers form, one is dealing with an aqueous layer in contact with an alcohol layer. Since the desired salts are soluble in both layers, repeated extractions with alcohols are necessary to remove all or practically all of the salts into the alcohol layer.

The main advantage of the described use of alcohol according to the present invention over the conventional use of sulfuric acid to react with all the soda that is present in the black liquor is that by use of alcohol it is possible to return a large part of the soda and organic matter to the pulp mill recovery system in useable form. Furthermore, the amount of sulfuric acid required is reduced considerably. The extent of this economy can be illustrated by observing the percentage of the black liquor solids which are precipitated with alcohol and by comparing the ratio of salts of organic acids to total solids in the original black liquor and in the alcohol soluble portion of the black liquor. Economy in sulfuric acid is illustrated by comparing the ratio of sulfuric acid required to liberate the organic acids from their salts with that required to react with other forms of soda that are present before and after treatment with alcohol.

These comparisons can be made only after the material in question has been analyzed to determine the amounts of formic, acetic, lactic and glycolic acid salts that are present. Until recently, no satisfactory method of analysis has been available. We have found, however, that the partition chromatographic method which is described by C. S. Marvel and R. D. Rands, Jour. Am. Chem. Soc., 72, 2642 (1950), gives satisfactory results. By means of this method, we have been able to establish that on the average the solids in black liquor contain about 3.5% sodium acetate, 5.8% sodium formate, 4.4% sodium lactate, and 2.3% sodium glycolate or a total of about 16% of the total solids as salts of these four acids. The rest of the material is a complex mixture of materials including organic matter derived from lignin and carbohydrates, sodium hydroxide, sodium carbonate and various other sodium salts. In the case of kraft black liquor, there is some sodium sulfide and various other sulfur compounds. For each part of sodium that is combined in the salts of the four organic acids, there are approximately three parts of sodium combined in other ways that must be neutralized, e. g. with sulfuric acid, before the desired acids can be liberated from their salts. Similar ratios for the material dissolved in the alcohol are given in the examples hereinafter.

It is indicated that by alcohol treatment of black liquor according to this invention the per cent concentration of organic acid salts in the dissolved material has been raised from 16%–22% to about 31%. This in itself is not the most important factor because after these materials are acidified with sulfuric acid, a large part of this extraneous material precipitates and can be separated from the acid in a form suitable for return to the pulp mill recovery furnace. It is important, however, that for the material that dissolves in the alcohol, only one to two parts of sulfuric acid are required in addition to each part of acid that reacts with the sodium in the organic acid salts as compared with three parts when the original black liquor is treated. This saving in sulfuric acid consumption is a measure of the amount of soda lost to the pulp mill which will need to be replaced by purchase of soda in some form such as sodium carbonate or sodium hydroxide. Since the cost of soda is greater than that of sulfuric acid, the savings made possible by this invention are much greater than the mere cost of the sulfuric acid alone. In case the kraft process is utilized, a large part of the sodium sulfate which forms can be re-used in the process, but this would not be the case if the entire amount of black liquor would be acidified directly with sulfuric acid as in the conventional process described above.

Preferably sulfuric acid is used for liberation of the organic acids from their salts, because in the kraft process the sodium sulfate can be returned to the recovery. However, other mineral acids such as hydrochloric or phosphoric can be used if one prefers to do so.

One desirable means of recovering soda (prior to the use of sulfuric acid for liberating the organic acids from their salts) in a form suitable for re-use in the pulp mill recovery process, is to neutralize the aqueous solution with carbonic acid. By treating the solution with carbon dioxide gas, or with gases such as stack gases which contain carbon dioxide, all of the soda except that which is tied up with organic acids is converted to sodium bicarbonate. A large portion of the sodium bicarbonate separates from the solution with the organic precipitate and can be returned to the pulp mill recovery furnace.

and solids were mixed by stirring and then separated by centrifuging. The liquid layer was removed by decantation and analyzed for solid content and for organic acids and titrated with standard sulfuric acid to determine the total amount of acid required to lower the pH to 2. All extractions were made at room temperature but the time of contact with the methanol varied as shown in the table of data. The tabulated data show the amount of solids dissolved in terms of per cent of the original weight of black liquor solids, the amount of acetic, formic, lactic and glycolic acids in terms of the per cent of each acid that is present in the original black liquor solids, the percentage of the total solids soluble in methanol that is accounted for as the salts of the four acids found on analysis, and the percentage of the sulfuric acid used to bring the pH to 2 that would be required for reaction with the sodium salts of the acids found on analysis.

| Ext'n. No. | Time of contact in hrs. | Solids ext'd, Percent of Original Solids | Acids extracted—Percent of amount in original solids | | | | Percent NaOAS[1] on Dissolved Solids | Percent of Total $H_2SO_4$ used by NaOAS[1] |
|---|---|---|---|---|---|---|---|---|
| | | | Acetic | Formic | Lactic | Glycolic | | |
| 1 | 0.5 | 14.1 | 28.2 | 19.2 | 25.6 | 22.2 | 28 | 40 |
| 2 | 0.5 | 14.9 | 25.6 | 12.0 | 24.0 | 21.0 | 22 | 30 |
| 3 | 16.0 | 14.0 | 24.3 | 25.3 | 29.4 | 22.8 | 31 | 43 |
| 4 | 1.0 | 10.0 | 17.4 | 13.8 | 14.7 | 15.3 | 26 | 37 |
| Total | | 53.0 | 95.7 | 71.6 | 94.7 | 81.5 | | |

[1] Sodium salts of the organic acids.

If the volume of filtrate is large, it is desirable to concentrate the carbonated filtrate to recover an additional crop of sodium bicarbonate which, because of its lower solubility in water, is easily separated from the sodium salts of acetic, formic, lactic, and glycolic acids. Such removal of sodium bicarbonate reduces the amount of sulfuric acid required to convert the organic acid salts into free acids. The amount of mineral acid required to liberate the organic acids from their salts can be considerably reduced by this use of carbon dioxide or its equivalent. While it is preferred to use carbon dioxide in the manner herein disclosed for the purpose of economy, direct acidification with mineral acid is equally effective from a technical standpoint.

The following examples illustrate specific embodiments of this invention, but the invention is not limited thereto. In each case the partition chromatographic method of analysis cited hereinbefore was used to determine the amount of desired organic acids present. Per cent as used herein is by weight.

*Example 1*

A 1.02 gram portion of dry black liquor solids was extracted with 50 ml. of dry methanol by mixing the solids thoroughly with the alcohol. The solvent was removed by filtration and the precipitate was washed twice with methanol. The washings, which totalled 50 ml., were combined with the original methanol solution and the mixture was evaporated to dryness on a steam bath. The residue was dissolved in 2 ml. of water. It was all soluble. The aqueous solution was acidified with 0.5 ml. of sulfuric acid solution, containing 500 grams per liter of $H_2SO_4$, and the resulting acidic solution was analyzed by the partition chromatographic method. A comparison of the results obtained in this analysis with those obtained on the original black liquor solids (using the same method of analysis in each case) indicated that the alcohol extraction had dissolved 90% of the acetate, 76% of the formate, and 100% of the lactate. The glycolic acid was not determined.

*Example 2*

A 25 gram sample of dry black liquor solids was extracted with four successive 50 ml. portions of dry methanol. After each addition of methanol, the liquid

*Example 3*

This example shows the effect of time of contact during extractions.

A 25 gram sample from a batch of dry black liquor solids was extracted with five successive 50 ml. portions of methanol as described in Example 2, except that in each case the solids were shaken for 30 minutes on a mechanical shaking machine then centrifuged and separated immediately. Another 25 gram sample of the same material was treated in exactly the same manner except that the mixtures were shaken for 45 minutes and allowed to stand for 24 hours during each extraction. The total amounts of the acids extracted were determined by analysis of the undissolved portion before and after extraction. The percentages of acids that dissolved in the methanol are as follows: (no analysis was made for glycolic acid).

| | 30-minute extractions | 24-hour extractions |
|---|---|---|
| | Percent | Percent |
| Acetic acid | 65.6 | 80.5 |
| Formic acid | 50.6 | 73.4 |
| Lactic acid | 64.7 | 78.0 |

*Example 4*

A number of single stage extractions were made by contacting dry black liquor solids with methanol and with mixtures of methanol and ethanol by suspending the solids in the solvent in a flask and heating them under a reflux condenser, then separating solids from solution. The solution was then analyzed. No analysis was made for glycolic acid. The data from these tests are as follows:

| Test No. | grams dry solids | ml. methanol | ml. ethanol | Percent of original acids extracted | | |
|---|---|---|---|---|---|---|
| | | | | Acetic | Formic | Lactic |
| 1 | [1]25 | [1]50 | 0 | 38 | 16 | 36 |
| 2 | 20 | 40 | 0 | 38 | 44 | 37 |
| 3 | 16.2 | 22 | 22 | 45 | 23 | 30 |
| 4 | 15 | 7.5 | 22.5 | 8 | 5 | 4 |

[1] Extract made at room temperature (with 24-hour contact).

Example 5

A 63 gram portion of concentrated black liquor containing 39.2 grams solids and 23.8 grams water was mixed with 10 ml. of methanol to thin the tarry material so it would pour easily. The resulting syrupy material was poured into a centrifuge bottle containing 115 ml. of methanol and stirred. The mixture was centrifuged, the liquid layer was decanted off, and the precipitate was washer with 20 ml. of methanol. The methanol used for washing was combined with the solution obtained from the original precipitation. The dry weight of the precipitate was 12.2 grams (31.1% of the original solids). The acids in the extract were determined by direct analysis and by difference based on the analysis of the acids remaining in the precipitate. The amounts of each of the acids in the alcohol solution as found by these analyses are given below. The true value lies somewhere within the indicated range.

| Acid, Percent | Direct analysis | From analysis of solid |
|---|---|---|
| Acetic | 91 | 89.3 |
| Formic | 72 | 87.5 |
| Lactic | 83 | 92.0 |
| Glycolic | 75 | 28.0 |

The methanol was then removed by distillation. The viscous aqueous solution that remained was diluted with a little water and was acidified with carbon dioxide. The precipitate which formed was removed by filtration. The filtrate still contained 32% of the solids originally present in the black liquor concentrate. The filtrate was acidified to 2 pH with sulfuric acid and the resulting precipitate was removed by filtration. The filtrate on analysis was found to contain the following percentages of the acids originally present: Acetic 72%, formic 56%, lactic 62%. No analysis was made for glycolic acid. The amount of sulfuric acid required to react with the sodium salts of these acids was 55% of the sulfuric acid required to lower the pH to 2. The sodium salts of the acids which had been occluded to the precipitate that was obtained when the solution was acidified with carbon dioxide, was recovered by washing these precipitates with methanol. Later tests indicated that washing these precipitates with sodium sulfate solution would be preferable because less organic matter would dissolve in the aqueous sodium sulfate solution.

Example 6

A 53.5 gram sample of black liquor concentrate (44% solids) as it came from the pulp mill evaporators, containing 23.5 grams solids and 30 grams water, was mixed with 150 ml. ethanol and shaken in a centrifuge bottle and allowed to stand overnight. Then the mixture was centrifuged and the alcohol layer was decanted from the aqueous layer and analyzed. It was found to contain 21% of the original black liquor solids. The percentages of acids based on the amount present in the original black liquor were: Acetic 45.4%, formic 43.8%, and lactic 34.3%. No analysis was made for glycolic acid. The percentage of the total acid required to bring the pH to 2 that was required to react with the sodium salts of the organic acids was 31%.

Example 7

This example illustrates a three stage extraction of 46% solids black liquor with ethanol, keeping water present in system.

A 500 gram portion of 46% solids black liquor concentrate was stirred with 500 ml. of 95% ethanol (denatured formula 12). The top layer was decanted. The bottom layer was stirred with 500 ml. of aqueous alcohol, which was prepared by diluting 400 ml. of 95% alcohol to 500 ml. with water, and the layers were separated as before. The extraction was repeated using another 400 ml. portion of alcohol diluted to 500 ml. with water. Each of the decanted solutions were analyzed, giving the data listed below: (no analysis was made for glycolic acid).

| | 1st extract | 2d extract | 3rd extract | Total acids extracted, percent |
|---|---|---|---|---|
| Volume, ml | 525 | 530 | 545 | |
| Weight, grams | 472.5 | 475.4 | 483.2 | |
| Solids, grams | 61.4 | 28.3 | 14.3 | |
| Percent of acids originally present: | | | | |
| Acetic | 42.8 | 24.7 | 16.5 | 84.0 |
| Formic | 32.5 | 21.6 | 18.6 | 72.7 |
| Lactic | 19.5 | 19.8 | 14.1 | 53.4 |

The alcohol solutions were combined and the alcohol was distilled off, leaving an aqueous solution. This solution was saturated with carbon dioxide and the precipitate which formed was removed by filtration. The precipitate was washed with a little sodium sulfate solution and the washings were combined with the original filtrate. The solution was acidified to a pH of 2 with sulfuric acid. Analysis of this filtrate showed that it still contained the following percentages of the acids originally present in the black liquor concentrate: Acetic 68.8%, formic 69.4%, and lactic 51.9%.

Example 8

This example relates to the use of typical alcohol solvents for recovery of the sodium salts of the organic acids from the type of liquor that is obtained by heating a mixture of cellulosic material and an alkali as described in our copending application Serial Number 318,533, filed November 3, 1952. In this particular experiment, a mixture of 664 grams of oak sawdust and 4980 grams of an aqueous solution containing 332 grams of sodium carbonate was heated in a closed system at 260° C. for one hour. After the cook, the aqueous solution was separated from the insoluble material by vacuum filtration and the filtrate was concentrated until it contained 65.7% solids. Analysis showed that these solids contained 8.77% sodium acetate, 16.29% sodium formate, 13.12% sodium lactate, and 15.34% sodium glycolate. A total of 53.34% of the solids was accounted for as the sodium salts of these four acids. The rest of the material contained acid consuming constituents because, of the total amount of the sulfuric acid required to bring the mixture to 2 pH, only 58% would be needed to react with these known organic acid salts.

The solvents used to separate desired from undesired material were: (1) methanol; (2) a mixture of 80% methanol and 20% normal butanol; and (3) a mixture of 50% methanol, 30% isopropanol, and 20% normal butanol. All percentages are by weight.

In each case, 36.5 grams of the concentrate containing 24 grams of solids was stirred with 75 grams of the solvent for about one hour; the mixture was filtered, and the filter cake was washed with another 25 grams of solvent. The filtrate and the washings were combined.

In each case, the solvent was recovered by distillation and the resulting aqueous solution was analyzed to determine its total solids content, the amount of each of the four acids that are present in the form of sodium salts, and the amount of sulfuric acid required to acidify the solution to 2 pH. The data which are summarized below show the per cent of the original solids that dissolve in the solvent; the per cent of such solids that can be accounted for as sodium salts of acetic, formic, lactic, and glycolic acids; the per cent of each of the acids originally present that dissolve in the solvent; and the per cent of the total amount of sulfuric acid required to acidify the solution to 2 pH that would be required to react with the sodium salts of the known acids.

| | Methanol | Mixture of 80% Methanol, 20% N-Butanol | Mixture of 50% Methanol, 30% Isopropanol, 20% N-Butanol |
|---|---|---|---|
| Percent of original solids dissolved in solvent | 82.4 | 83.3 | 65.8 |
| Percent of H₂SO₄ that reacts with known salts | 76.3 | 80.6 | 85.8 |
| Percent organic acid salts on solids in solvent | 62.3 | 61.9 | 64.3 |
| Acetic acid in solvent, percent of original | 99.4 | 97.4 | 88.3 |
| Formic acid in solvent, percent of original | 95.1 | 95.5 | 82.2 |
| Lactic acid in solvent, percent of original | 98.0 | 99.2 | 83.3 |
| Glycolic acid in solvent, percent of original | 94.0 | 95.4 | 67.6 |

As many apparently widely different embodiments of this invention may be made without departing from the spirit and scope thereof, it is to be understood that the invention is not limited to the specific embodiments thereof except as defined in the appended claims.

What is claimed is:

1. Process of separating from a concentrate of the liquor resulting from an alkaline cook of cellulosic material, formic, acetic, lactic and glycolic acids and the sodium salts of said acids, which comprises contacting the concentrate with a solvent for said salts, the solvent being selected from the group consisting of methanol, ethanol, and propanol, a mixture of methanol and ethanol, a mixture of at least one of propanol and butanol with methanol, and a mixture of at least one of propanol and butanol with ethanol; filtering the solvent, containing said salts, from the remainder of the concentrate; removing from the filtrate the solvent employed and thereby leaving a mixture of said salts in aqueous solution.

2. Process of separating from a concentrate of the liquor resulting from an alkaline cook of cellulosic material, formic, acetic, lactic and glycolic acids, which comprises contacting the concentrate with a solvent for the sodium salts of said acids, the solvent being selected from the group consisting of methanol, ethanol, and propanol, a mixture of methanol and ethanol, a mixture of at least one of propanol and butanol with methanol, and a mixture of at least one of propanol and butanol with ethanol wherein methanol when used constitutes at least about 50% of said alcohol mixture; filtering the solvent, containing the sodium salts of said acids, from the remainder of the concentrate; removing from the filtrate the solvent employed; then precipitating undesirable material from the filtrate by acidifying same; removing the precipitate and thereby leaving a mixture of said acids in aqueous solution; separating the individual acids from each other.

3. Process of separating from a concentrate of the liquor resulting from an alkaline cook of cellulosic material, formic, acetic, lactic and glycolic acids, which comprises contacting the concentrate with a solvent for the sodium salts of said acids, the solvent being selected from the group consisting of methanol, ethanol, and propanol, a mixture of methanol and ethanol, a mixture of at least one of propanol and butanol with methanol, and a mixture of at least one of propanol and butanol with ethanol wherein methanol when used constitutes at least about 50% of said alcohol mixture; filtering the solvent, containing the sodium salts of said acids, from the remainder of the concentrate; removing from the filtrate the solvent employed; then precipitating undesirable material from the filtrate by acidifying same; removing the precipitate and thereby leaving a mixture of said acids in aqueous solution.

4. Process of separating from a concentrate of the liquor resulting from an alkaline cook of cellulosic material, formic, acetic, lactic and glycolic acids, which comprises contacting the concentrate with a solvent for the sodium salts of said acids, the solvent being selected from the group consisting of methanol, ethanol, and propanol, a mixture of methanol and ethanol, a mixture of at least one of propanol and butanol with methanol, and a mixture of at least one of propanol and butanol with ethanol wherein methanol when used constitutes at least about 50% of said alcohol mixture; filtering the solvent, containing the sodium salts of said acids, from the remainder of the concentrate; removing from the filtrate the solvent employed; precipitating undesirable material from the filtrate by contacting same with carbon dioxide; filtering out the precipitate, then precipitating additional undesirable material from the latter filtrate by acidifying same; removing the latter precipitate and thereby leaving a mixture of said acids in aqueous solution.

5. Process of separating from a concentrate of the liquor resulting from an alkaline cook of cellulosic material, formic, acetic, lactic and glycolic acids, which comprises contacting the concentrate with methanol; filtering the methanol, containing the sodium salts of said acids, from the remainder of the concentrate; removing the methanol from the filtrate; then precipitating undesirable material from the filtrate by acidifying same; removing the precipitate and thereby leaving a mixture of said acids in aqueous solution.

6. Process of separating from a concentrate of the liquor resulting from an alkaline cook of cellulosic material, formic, acetic, lactic and glycolic acids, which comprises contacting the concentrate with ethanol; filtering the ethanol, containing the sodium salts of said acids, from the remainder of the concentrate; removing the ethanol from the filtrate; then precipitating undesirable material from the filtrate by acidifying same; removing the precipitate and thereby leaving a mixture of said acids in aqueous solution.

7. Process of separating from a concentrate of the liquor resulting from an alkaline cook of cellulosic material, formic, acetic, lactic and glycolic acids, which comprises contacting the concentrate with propanol; filtering the propanol, containing the sodium salts of said acids, from the remainder of the concentrate; removing the propanol from the filtrate; then precipitating undesirable material from the filtrate by acidifying same; removing the precipitate and thereby leaving a mixture of said acids in aqueous solution.

8. Process of separating from a concentrate of the liquor resulting from an alkaline cook of cellulosic material, formic, acetic, lactic and glycolic acids, which comprises contacting the concentrate with a mixture of methanol and propanol wherein methanol constitutes at least about 50% of said alcohol mixture; filtering the alcohol mixture, containing the sodium salts of said acids, from the remainder of the concentrate; removing the alcohols from the filtrate; then precipitating undesirable material from the filtrate by acidifying same; removing the precipitate and thereby leaving a mixture of said acids in aqueous solution.

9. Process of separating from a concentrate of the liquor resulting from an alkaline cook of cellulosic material, formic, acetic, lactic and glycolic acids, which comprises contacting the concentrate with a mixture of methanol and butanol wherein methanol constitutes at least about 50% of said alcohol mixture; filtering the alcohol mixture, containing the sodium salts of said acids, from the remainder of the concentrate; removing the alcohols from the filtrate; then precipitating undesirable material from the filtrate by acidifying same; removing the precipitate and thereby leaving a mixture of said acids in aqueous solution.

10. Process of separating from a concentrate of the liquor resulting from an alkaline cook of cellulosic material, formic, acetic, lactic and glycolic acids, which comprises contacting the concentrate with a mixture of propanol and butanol with methanol wherein methanol constitutes at least about 50% of said alcohol mixture; filtering the alcohol mixture, containing the sodium salts of said acids, from the remainder of the concentrate; removing the alcohols from the filtrate; then precipitating undesirable material from the filtrate by acidifying same; removing the precipitate and thereby leaving a mixture of said acids in aqueous solution.

11. Process of separating from a concentrate of the liquor resulting from an alkaline cook of cellulosic material, formic, acetic, lactic and glycolic acids, which comprises contacting the concentrate with a mixture of methanol and ethanol wherein methanol constitutes at least about 50% of said alcohol mixture; filtering the alcohol mixture, containing the sodium salts of said acids, from the remainder of the concentrate; removing the alcohols from the filtrate; then precipitating undesirable material from the filtrate by acidifying same; removing the precipitate and thereby leaving a mixture of said acids in aqueous solution.

References Cited in the file of this patent

UNITED STATES PATENTS

| | | |
|---|---|---|
| 431,243 | Alkier | July 1, 1890 |
| 1,177,746 | Laszloffy | Apr. 4, 1916 |

OTHER REFERENCES

Leonard et al.: Ind. and Eng. Chem., vol. 40, pp. 57–67 (1948).

McLaughlin, Chem. Abstracts, vol. 43, col. 7682 (1949).